US012559113B2

(12) United States Patent
Vazquez-Chanlatte et al.

(10) Patent No.: US 12,559,113 B2
(45) Date of Patent: Feb. 24, 2026

(54) VEHICLE DECISION MAKING USING SEQUENTIAL INFORMATION PROBING

(71) Applicants: Nissan North America, Inc., Franklin, TN (US); The University of Massachusetts, Boston, MA (US)

(72) Inventors: Marcell Jose Vazquez-Chanlatte, Palo Alto, CA (US); Stefan Witwicki, San Carlos, CA (US); Shlomo Zilberstein, Amherst, MA (US); Saaduddin Mahmud, Amhurst, MA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 194 days.

(21) Appl. No.: 18/429,196

(22) Filed: Jan. 31, 2024

(65) Prior Publication Data

US 2025/0242816 A1     Jul. 31, 2025

(51) Int. Cl.
*B60W 50/00* (2006.01)
*B60W 60/00* (2020.01)
*G05B 13/02* (2006.01)

(52) U.S. Cl.
CPC ............ *B60W 50/00* (2013.01); *B60W 60/00* (2020.02); *G05B 13/0265* (2013.01); *B60W 2050/0028* (2013.01)

(58) Field of Classification Search
CPC .... G05B 13/0265; B60W 60/00; B60W 50/00
See application file for complete search history.

(56) References Cited

U.S. PATENT DOCUMENTS

| | | | |
|---|---|---|---|
| 2023/0001936 A1* | 1/2023 | Skaggs ................. | G06Q 40/08 |
| 2023/0311003 A1* | 10/2023 | Cao ......................... | A63F 13/67 |
| | | | 463/23 |
| 2023/0347882 A1* | 11/2023 | Tian ...................... | B60W 40/04 |
| 2024/0303501 A1* | 9/2024 | Zhang ................... | G06N 3/006 |

OTHER PUBLICATIONS

Ricardo Cannizzaro et al: "Towards Probabilistic Causal Discovery, Inference & Explanations for Autonomous Drones in Mine Surveying Tasks", arxiv.org, Cornell University Library, 201 Olin Library Cornell University Ithaca, NY 14853, Oct. 1, 2023 {Oct. 1, 2023).

* cited by examiner

*Primary Examiner* — Kenneth M Dunne
(74) *Attorney, Agent, or Firm* — Young Basile Hanlon & MacFarlane, P.C.

(57) ABSTRACT

Vehicle decision-making is analyzed and can be used to modify a decision-making process. For subsets of features comprising a vehicle operational scenario, a first value is generated that quantifies behavior of an artificial intelligence (AI) agent as the AI agent performs a sequence of actions within a first world model based on a complete set of observations for the subset of features. A first world model is a copy of a second world model for sequential decision making. A second value is generated that quantifies behavior of an AI agent as the AI agent performs a sequence of actions in the second world model based on an incomplete set of observations for the subset of features. A difference between the first and second values determines the impact of individual features on the AI agent within the second world model. A decision-making process of the AI agent can be updated.

20 Claims, 6 Drawing Sheets

VEHICLE DECISION MAKING USING SEQUENTIAL INFORMATION PROBING

TECHNICAL FIELD

This disclosure relates generally to autonomous vehicle operational management and autonomous driving, and more particularly to the decision-making of an autonomous vehicle using sequential information probing.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. The action may be selected using artificial intelligence (e.g., trained machine-learning models) or other decision-making models.

SUMMARY

Disclosed herein are aspects, features, elements, implementations, and embodiments of a framework for a decision-making model (i.e., AI agent) of an autonomous vehicle (AV). The framework facilitates an understanding of how a lack of information shapes the behavior of the decision-making model (e.g., information-driven behaviors vs. goals-driven behaviors). The model may be a Partially Observable Markov Decision Process (POMDP) model in some examples. The understanding developed using the framework can improve a decision-making model and/or the decision-making process of an AV.

A first aspect is a method that includes determining a first world model, wherein the first world model is a copy of a second world model for sequential decision making with incomplete state information; for respective subsets of features comprising a vehicle operational scenario within a vehicle transportation system: generating a first value quantifying behavior of an artificial intelligence (AI) agent as the AI agent performs a sequence of actions responsive to the vehicle operational scenario using the first/world model, wherein the AI agent includes a complete set of observations for the subset of features within the first world model; generating a second value quantifying behavior of an AI agent as the AI agent performs a sequence of actions responsive to the vehicle operational scenario using the second world model, wherein the AI agent includes an incomplete set of observations for the subset of features within second world model; and determining a difference between the first value and the second value; calculating an impact of individual features on the AI agent within the second world model using the differences; and selectively, based on the impact of individual features, updating a decision-making process of the AI agent.

A second aspect is an apparatus. The apparatus includes a processor that is configured to execute instructions stored in memory to determine a first world model, wherein the first world model is a copy of a second world model for sequential decision making with incomplete state information; for respective subsets of features comprising a vehicle operational scenario within a vehicle transportation system generate a first value quantifying behavior of an artificial intelligence (AI) agent as the AI agent performs a sequence of actions responsive to the vehicle operational scenario using the first world model, wherein the AI agent includes a complete set of observations for the subset of features within the first world model; generate a second value quantifying behavior of an AI agent as the AI agent performs a sequence of actions responsive to the vehicle operational scenario using the second world model, wherein the AI agent includes an incomplete set of observations for the subset of features within second world model; and determine a difference between the first value and the second value; calculate an impact of individual features on the AI agent within the second world model using the differences; and selectively, based on the impact of individual features, update a decision-making process of the AI agent.

A third aspect is a non-transitory computer-readable medium storing instructions operable to cause one or more processors to perform operations that include determining a first world model, wherein the first world model is a copy of a second world model for sequential decision making with incomplete state information; for respective subsets of features comprising a vehicle operational scenario within a vehicle transportation system: generating a first value quantifying behavior of an artificial intelligence (AI) agent as the AI agent performs a sequence of actions responsive to the vehicle operational scenario using the first world model, wherein the AI agent includes a complete set of observations for the subset of features within the first world model; generating a second value quantifying behavior of an AI agent as the AI agent performs a sequence of actions responsive to the vehicle operational scenario using the second world model, wherein the AI agent includes an incomplete set of observations for the subset of features within second world model; and determining a difference between the first value and the second value; calculating an impact of individual features on the AI agent within the second world model using the differences; and selectively, based on the impact of individual features, updating a decision-making process of the AI agent.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. As used herein, an AV encompasses a semi-autonomous vehicle, or any other vehicle capable of operating responsive to a remote instruction as discussed below.

During autonomous driving, and at different time steps (e.g., at every time step), some component (e.g., a decision-making module or model such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, model, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV.

Decision making in such circumstances can be very opaque process for several reasons, including without limitation the number of parameters used in the process, and their differing effects into a solution. The present disclosure manipulates inputs into a decision-making model to further process the decision-making model. Details are described in detail below starting with a description of an AV with which the invention may be used.

Figure 1:
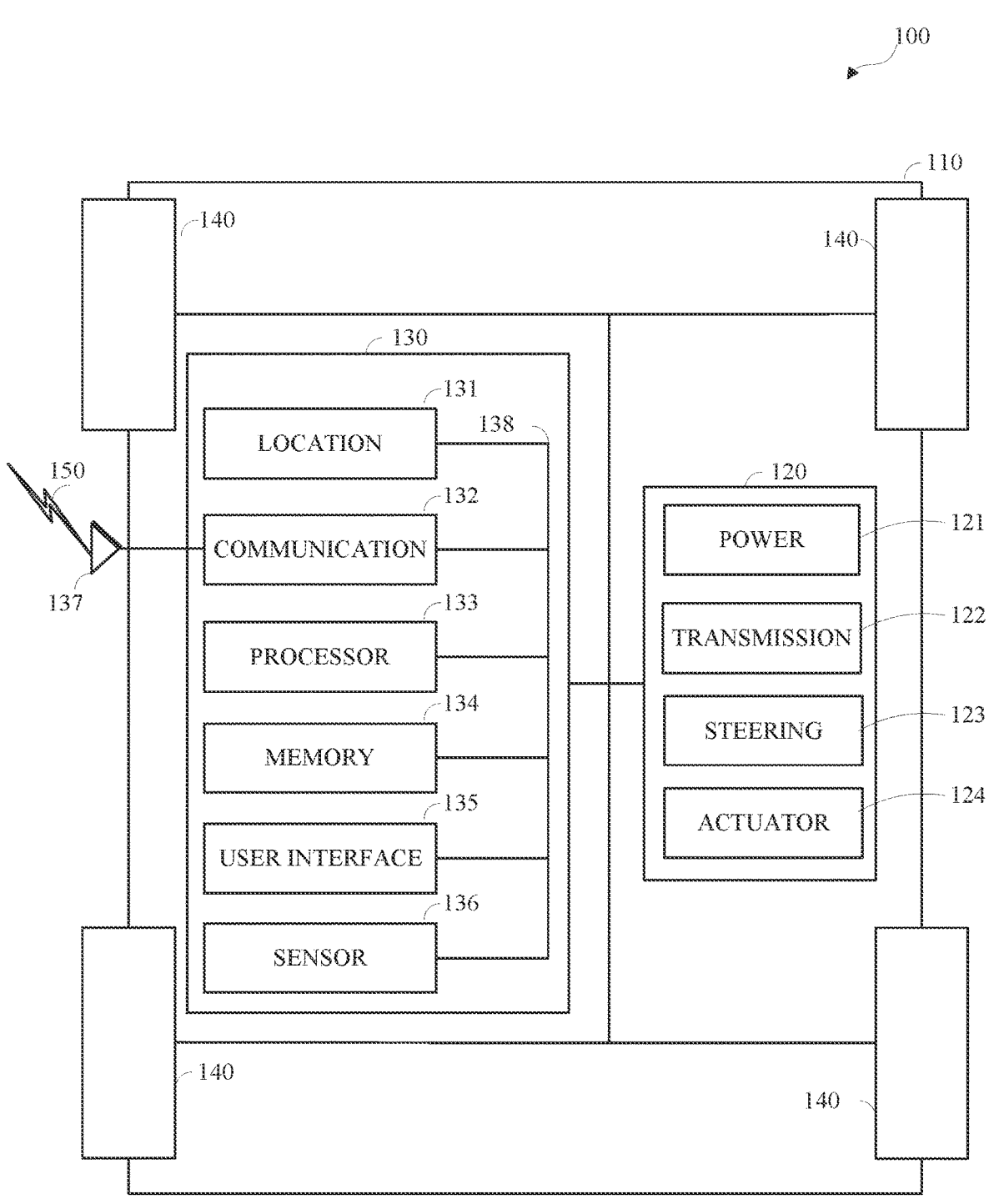
FIG. 1 is a diagram of an example of a portion of a vehicle in which the aspects, features, and elements disclosed herein may be implemented.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the apparatus or controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
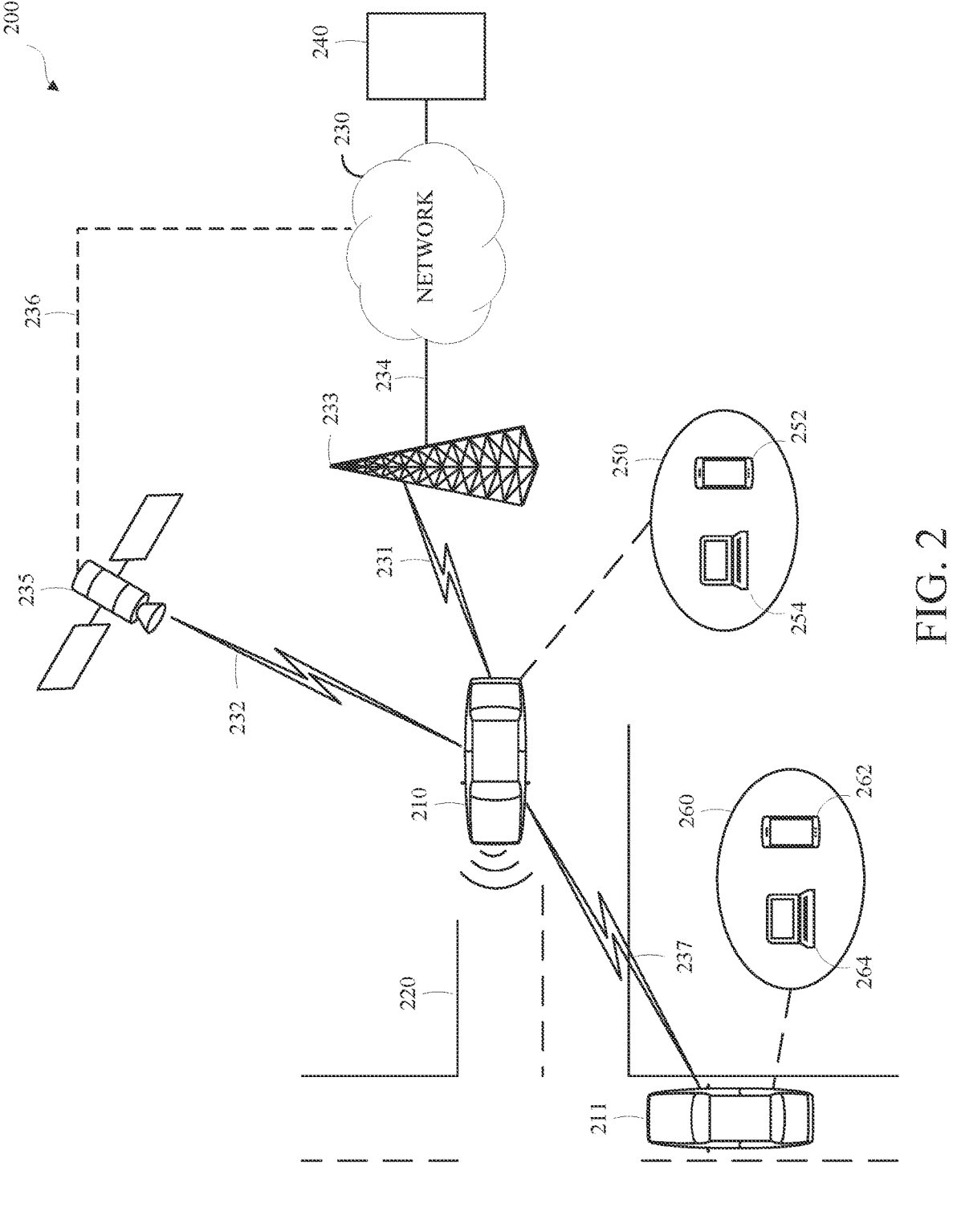
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
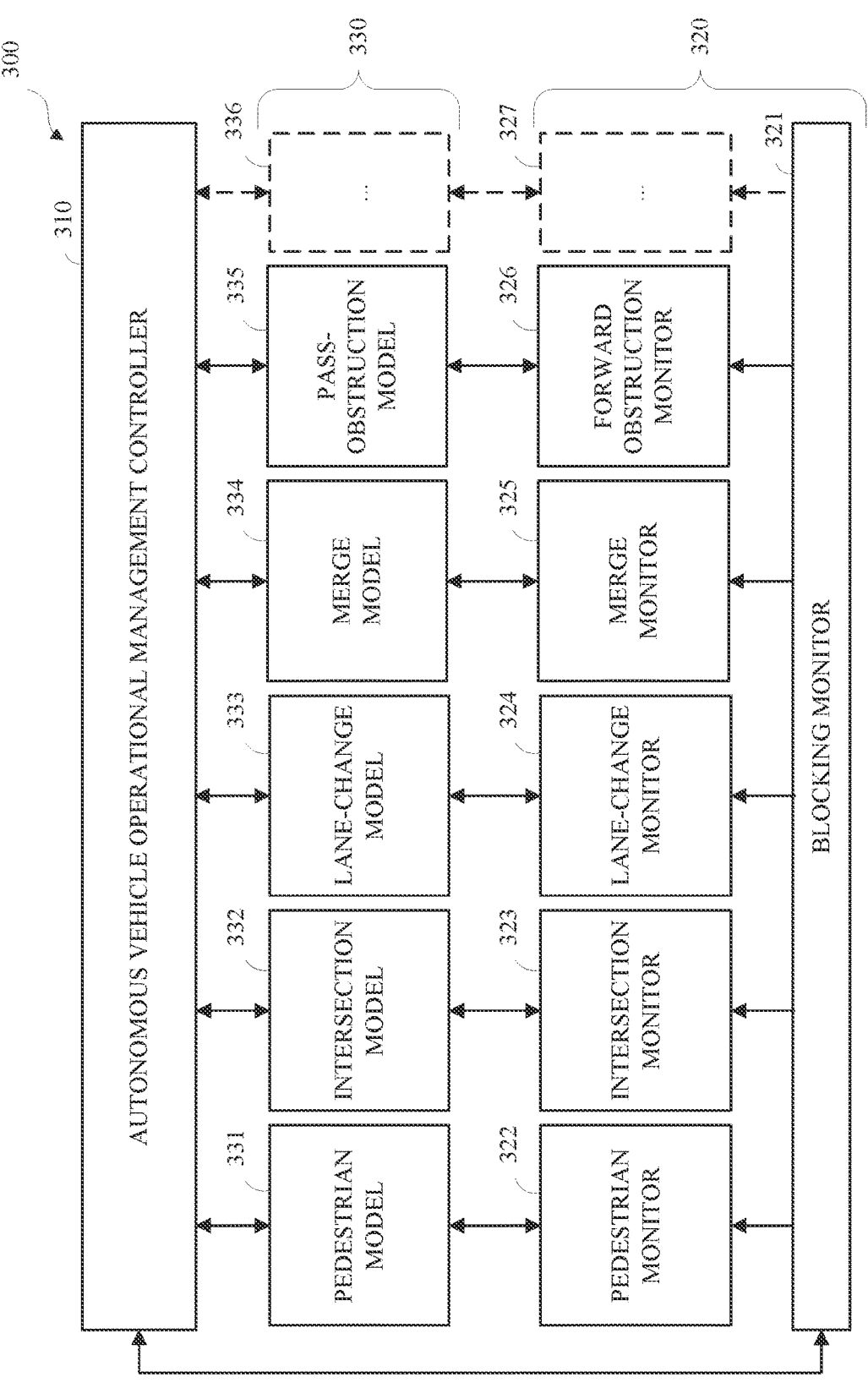
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 3, the autonomous vehicle operational management system 300 includes an autonomous vehicle operational management controller (AVOMC) 310, operational environment monitors 320, and operation control evaluation modules (also referred to as models).

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 310 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received from the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment data representing aspects of the operational environment of the autonomous vehicle, and output the operational environment data to one or more scenario-specific monitor, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment data representing scenario-specific aspects of the operational environment of the autonomous vehicle, and output the operational environment data to one or more operation control evaluation models, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment data to one or more elements of the autonomous vehicle operational management system 300, such as the AVOMC 310. Although not shown in FIG. 3, a scenario-specific operational environment monitor 322, 323, 324, 325, 326 may output operational environment data to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the autonomous vehicle. For example, the blocking monitor 321 may receive the operational environment information from the AVOMC 310, from a sensor of the vehicle, from an external device, such as a remote vehicle or an infrastructure device, or a combination thereof. The blocking monitor 321 may read the operational environment information, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment, such as within 300 meters, of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operational control evaluation models.

The AVOMC 310 may identify one or more distinct vehicle operational scenarios based on one or more aspects of the operational environment represented by the operational environment data. For example, the AVOMC 310 may identify a distinct vehicle operational scenario in response to identifying, or based on, the operational environment data indicated by one or more of the operational environment monitors 320. The distinct vehicle operational scenario may be identified based on route data, sensor data, or a combination thereof. For example, the AVOMC 310 may identify one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models based on one or more aspects of the operational environment represented by the operational environment data, such as the identification of an upcoming scenario. An upcoming scenario may be a distinct vehicle operational scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models may include scenario-specific operation control evaluation model (SSOCEMs 330), such as a pedestrian-SSOCEM 331, an intersection-SSOCEM 332, a lane-change-SSOCEM 333, a merge-SSOCEM 334, a pass-obstruction-SSOCEM 335, or a combination thereof. A module 336 is shown using broken lines to indicate that the autonomous vehicle operational management system 300 may include any number of SSO-CEMs 330. For example, the AVOMC 310 may instantiate an instance of a SSOCEM 330 in response to identifying a distinct vehicle operational scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment data, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment data, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

A SSOCEM 330, once instantiated, can receive the operational environment information, including sensor data, to determine and output a candidate vehicle control action, also called a candidate action herein. A candidate action is a vehicle control action that is identified by the particular SSOCEM 330 as the likely optimal action for the vehicle to perform that will handle a particular scenario. For instance, a SSOCEM 330 configured to handle intersections (e.g., an intersection-SSOCEM 332) may output a "proceed", a candidate action that suggests proceeding through an intersection. At the same time, a SSOCEM 330 for handling lane changes (e.g., the lane-change-SSOCEM 333) may output a "turn left" candidate action indicating that the vehicle should merge left by two degrees. In some implementations, each SSOCEM 330 outputs a confidence score indicating a degree of confidence in the candidate action determined by the SSOCEM 330. For instance, a confidence score greater than 0.95 may indicate a very high confidence in the candidate action, while a confidence score less than 0.5 may indicate a relatively low degree of confidence in the candidate action. Further details of a SSOCEM 330 are described below.

The AVOMC 310 may receive one or more candidate actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In some implementations, the AVOMC 310 utilizes hard-coded logic to determine the vehicle control action from the candidate actions. For example, the AVOMC 310 may select the candidate action having the highest confidence score. In other implementations, the AVOMC 310 may select the candidate action that is the least likely to result in a collision. In other implementations, the AVOMC 310 may generate a compound action based on two or more non-conflicting candidate actions (e.g., compounding 'proceed' and 'turn left by two degrees' to result in a vehicle control action that causes the vehicle to veer left and proceed through an intersection). In some implementations, the AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a POMDP, which may describe how respective candidate actions affect subsequent candidate actions, and may include a reward function that outputs a positive or negative reward for respective vehicle control actions.

The AVOMC 310 may uninstantiate an instance of a SSOCEM 330. For example, the AVOMC 310 may identify a distinct set of operative conditions as indicating a distinct vehicle operational scenario for the autonomous vehicle, instantiate an instance of a SSOCEM 330 for the distinct vehicle operational scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

As referred to briefly above, a SSOCEM 330 may model a respective distinct vehicle operational scenario. The autonomous vehicle operational management system 300 includes any number of SSOCEMs 330, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 330 may include one or more models that are configured to determine one or more vehicle control actions for handling a scenario given a set of inputs. The models may include, but are not limited to, POMDP models, MDP models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 330 includes computer-executable instructions that define a manner by which the models operate and a manner by which the models are utilized.

A SSOCEM 330 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 330 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

For example, a POMDP model may include an autonomous vehicle at a first geospatial location and a first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

A SSOCEM 330 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 330 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 330 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection.

The autonomous vehicle then traverses the intersection using the candidate action as the vehicle control action for a temporal location. A result of traversing the intersection using the candidate action may be determined to update the RL model based on the result.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSO-CEM 335 may be POMDP models. In another example, the pedestrian-SSOCEM 331 may be an MDP model and the intersection-SSOCEM 332 may be a POMDP model. The AVOMC 310 may instantiate any number of instances of the SSOCEMs 330 based on the operational environment data. A module 336 is shown using broken lines to indicate that the autonomous vehicle operational management system 300 may include any number or additional types of SSO-CEMs 330.

One or more of the AVOMC 310, the operational environment monitors 320, or the SSOCEMs 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the SSOCEMs 330 may be independent of the operational rate of others.

As may be clear from the above description, these models are complex, and their outcomes are difficult to assess. The teachings herein access a representation of the policy (or strategy) adopted by the vehicle that can be used to determine what factors corroborated the decision that the AV will take. The determinations can be used for modification of the decision-making policy to address difficult vehicle operation scenarios.

Figure 4:
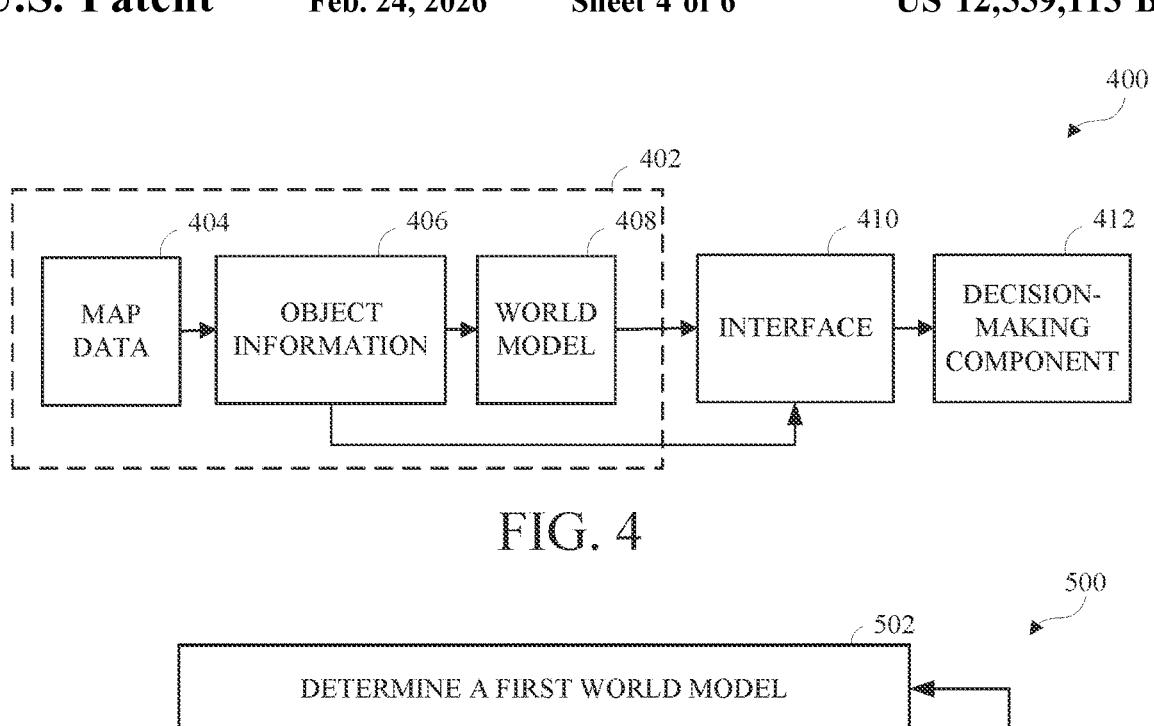
FIG. 4 is a diagram of a data pipeline of a vehicle decision-making system including a data determining interface according to the teachings herein.

FIG. 4 is a diagram of a data pipeline 400 of a vehicle decision-making system including a data determining interface 410 according to the teachings herein. As mentioned previously, the interface is between perception and decision-making. As shown in FIG. 4, the data determining interface 410 is between perception system 402 and a decision-making component 412. The perception system 402 may comprise map data 404, an object information module 406, and a world model 408. In some implementations, the perception system 402 receives the map data 404 as input such that a map is not part of the perception system 402.

The map data 404 comprises any map data representative of the operational environment about the AV, including the vehicle transportation network. The map data 404 may include HD map data, SD map data, or some combination of HD map data and SD map data. For example, some areas of the operational environment may be represented by HD map data, while others are represented by SD map data. In some implementations, discussed in further detail below, the map data 404 may not be available for some AVs and/or may not be available for at least a portion of the vehicle transportation network.

The object information module 406 can receive raw perception data from sensors of the AV, such as the sensor 136. The sensors 136 may be include a camera (e.g., an image camera), LiDAR, a GPS sensor or unit, or any other sensor or combination of sensors that images, captures, identifies, or otherwise detects the operational environment around the AV. The object information module 406 can receive data from other sources, such as from fixed infrastructure cameras, other vehicles within the vehicle transportation system, a remote vehicle support system, etc., through wired and wireless signal links described above with reference to FIG. 2. The object information module 406 can perform object association. For example, object association can include determining objects from the received signals. Object association may associate location information within each of the signals with a respective road object, e.g., a vehicle, a pedestrian or non-motorized vehicle, etc., within the vehicle transportation network. The object information module 406 may generate or maintain a state for at least some of the determined objects, such as a velocity (when an object is a dynamic object and not a static object), a pose, a geometry (such as width, height, and depth), a classification (e.g., bicycle, large truck, pedestrian, road sign, etc.), a lane location, or some combination thereof.

The world model 408 can output object information, including separately tracked objects with a respective trajectory for use in decision making of the AV. The world model 408 can output localization information, e.g., the position of objects relative to roads and/or lanes in the vehicle transportation network. The world model 408 may receive the sensed objects over time from the object information module 406. Using data such as the location, and heading and velocity information where available, sensed objects may be fused where appropriate. That is, the data associated with each object may be compared to determine whether respective objects identified by separate sources (e.g., from separate signals input to the object information module 406) may be the same object. Any technique for comparing the data of each sensed object may be used. The more similar the data is, the more likely two objects are the same. The data of the objects determined to be the same object are fused to generate an object, including a tracked object at positions over time (e.g., a fused trajectory).

In some implementations, some or all components of the perception system 402 can correspond to component(s) of the autonomous vehicle operational management system 300. In an example, the object information module 406, the world model 408, or both correspond to an operational environment monitor 320. The map data 404 may be part of an operational environment monitor 320 or more likely may be otherwise incorporated elsewhere, such as stored in memory 134 of the vehicle 100 and/or received remotely from the communication unit 132. Although the perception system 402 is shown as a single component of the data pipeline 400, at least some components of the perception system 402 may be duplicated (e.g., because multiple scenarios are indicated by the detected objects). For example, a single world model 408 may be used for all operational environment monitors 320, while a respective object information module 406 (e.g., each associated with an object within a scenario) may be used for each operational environment monitor 320. Other variations are possible.

The decision-making component 412 recommends an action (e.g., a candidate vehicle control action) for the AV, such as GO, YIELD/EDGE, or STOP. The action may be performed automatically by the AV. For example, the action may be performed by a processor of the AV, such as the processor 133, controlling one or more of brakes, acceleration (e.g., an accelerator pedal), steering (e.g., a steering wheel), etc., of the AV. The decision-making component 412 can correspond to components of the autonomous vehicle operational management system 300. In an example, the decision-making component 412 corresponds to a model of an SSOCEM 330. Accordingly, more than one decision-making component 412 may be used in implementations of the teachings herein. Outputs (e.g., candidate actions) from respective decision-making components 412 may be used to select a control action for the AV, such as doing the selection using the AVOMC 310 described previously.

Where the vehicle operational environment is such that multiple decision-making components 412 are required (e.g., because multiple scenarios are indicated by the detected objects), a respective data determining interface 410 may be associated with each decision-making component 412. This is because, as described in more detail below, the data determining interface 410 may be designed to determine, generate, or otherwise produce outputs required by a particular decision-making component 412 using different data sources of an AV. In some implementations where an AV incorporates an autonomous vehicle operational management system, the autonomous vehicle operational management system 300 may be modified to include a data determining interface 410 between respective operational environment monitors 320 and SSOCEMs 330, such as between the intersection monitor 323 and the intersection model such as intersection-SSOCEM 332.

Figure 5:
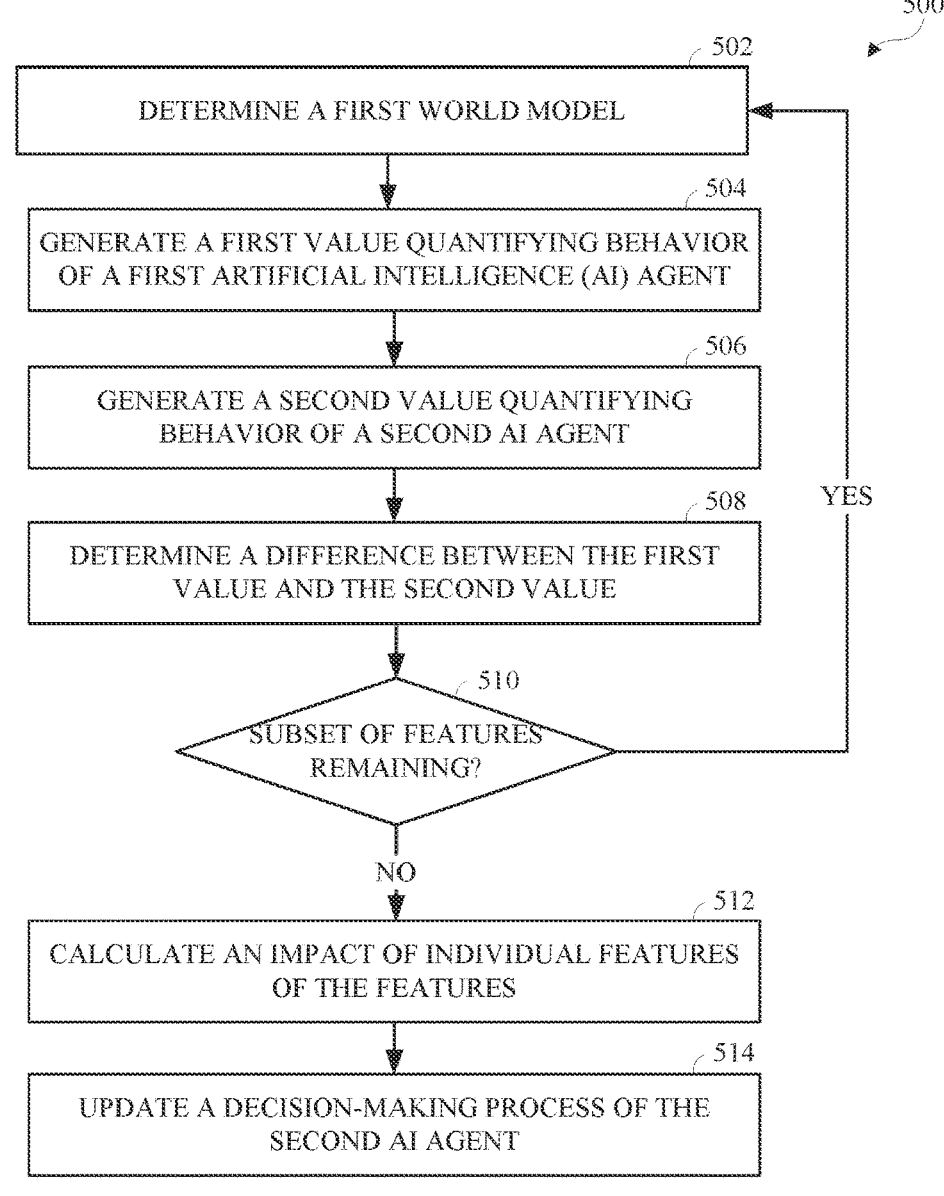
FIG. 5 is a flow chart diagram of a method for vehicle decision-making using sequential information probing according to the teachings herein.

FIG. 5 is a flow chart diagram of a method 500 for vehicle decision-making using sequential information probing according to the teachings herein. The method may be performed by a computer, processor, a controller, or any combination of hardware, with or without software. The method may be performed by the AV, such as by the processor 133, or may be performed remotely, such as by a processor or other hardware and optionally software at remote assistance support incorporating a communication device 240.

At operation 502, a first world model is determined. The first world model (also called a mirror world model) may be a copy of a second world model (also called an original world model) that is modified as described below. The second world model may be used for sequential decision making and may have incomplete state information. The first world model and the second world model may be components of the AVOMC 310. The first world model and the second world model may provide an input for use within a SSOCEM (i.e. the SSOCEM 330 of FIG. 3). The second world model may be the world model 408 of FIG. 4.

The second world model may be a representation of a distinct vehicle operational scenario based on one or more aspects (i.e., features) of the operational environment (e.g., the vehicle transportation system) represented by the operational environment data.

Figure 6:
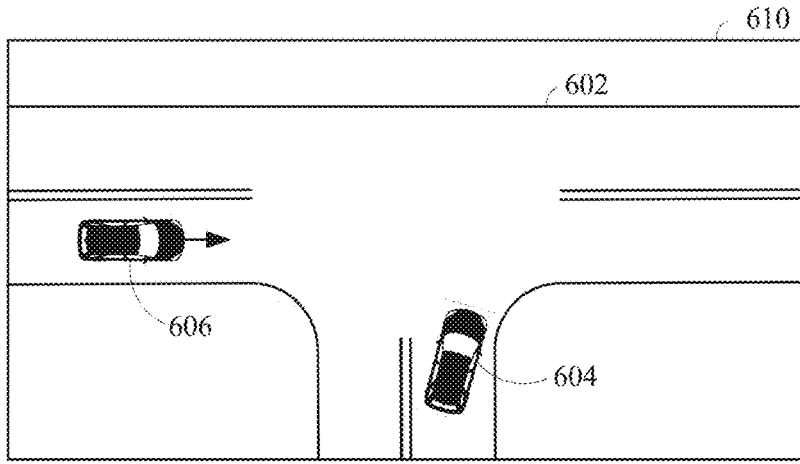
FIG. 6 is a diagram of an example of a vehicle operational scenario for which a decision-making model generates a solution.
Figure 6:
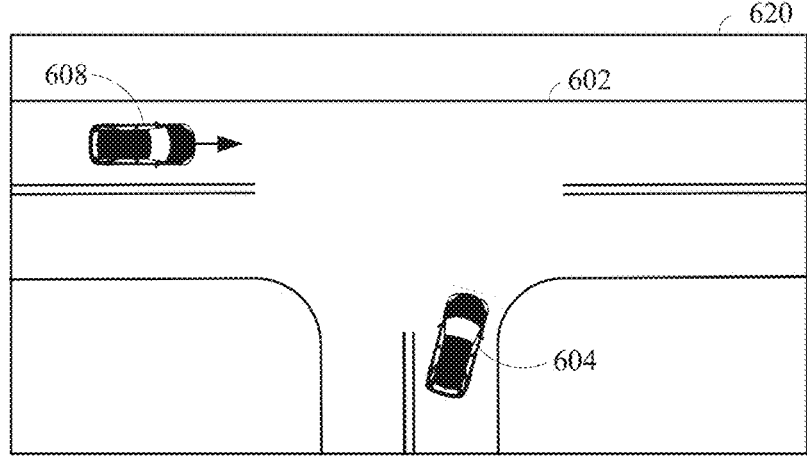
Figure 6:
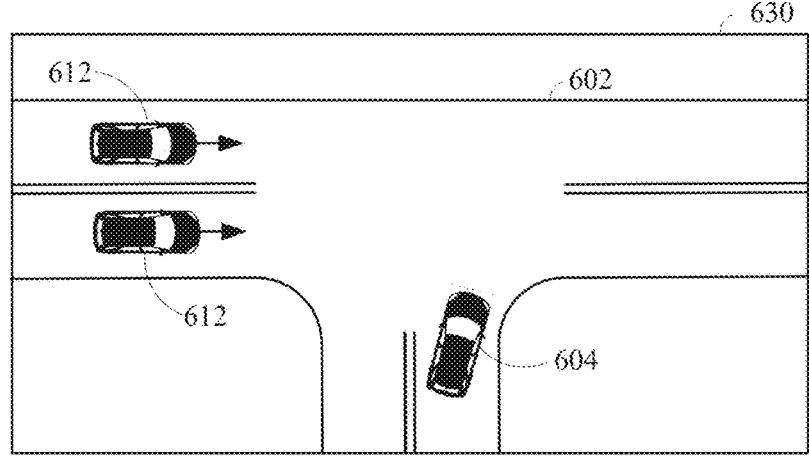

FIG. 6 is a diagram of examples of vehicle operational scenarios 610, 620, and 630 for which a decision-making model generates a solution, also referred to as a decision herein. These examples are used to explain how the teachings herein would apply to a model.

The vehicle operational scenario 610 illustrates an intersection 602. A vehicle 604 is approaching the intersection 602. The goal of the vehicle 604 is to safely traverse the intersection 602 by making a right-hand turn. The vehicle 604 can be the vehicle 100 of FIG. 1. The vehicle 604 can be one of the vehicles 210/211 of FIG. 2. The vehicle 604 can include an autonomous vehicle operational management system, such as the autonomous vehicle operational management system 300 of FIG. 3. As such, the vehicle 604 can be an autonomous vehicle or can be a semi-autonomous vehicle.

The vehicle operational scenario 610 also includes a vehicle 606 that is approaching the intersection 602 from the left side of the vehicle 604. The vehicle 606 has the right of way and does not have a stop sign. Thus, vehicle 606 can proceed through the interaction without stopping first. However, the vehicle 606 may begin slowing down to a stop or turn before crossing the path of the vehicle 604. Thus, the intersection 602 may appear as a T-like intersection with respect to the vehicle 604. Additionally, if the vehicle 606 does not stop or turn before crossing the path of the vehicle 604, the vehicle 606 may collide with the vehicle 604 if the vehicle 604 continues to execute the right-hand turn before the vehicle 606 passes. As such the vehicle 604 may wait to execute the right-hand turn until the vehicle 606 passes to prevent a collision and safely traverse the intersection 602.

The vehicle operational scenario 620 illustrates an intersection 602. A vehicle 604 is approaching the intersection 602. The goal of the vehicle 604 is to safely traverse the intersection 602 by making a right-hand turn.

The vehicle operational scenario 620 also includes a vehicle 608 that is approaching the intersection 602 from the left side of the vehicle 604. The vehicle 608 has the right of way and does not have a stop sign. Thus, vehicle 608 can proceed through the interaction without stopping first. However, the vehicle 608 may begin slowing down to a stop before crossing the path of the vehicle 604. Thus, the intersection 602 may appear as a T-like intersection with respect to the vehicle 604. In this scenario, the vehicle 604 may complete the right-hand turn regardless of whether the vehicle 608 stops at or continues through the intersection as the path of vehicle 608 will not intersect with vehicle 604.

The vehicle operational scenario 630 illustrates an intersection 602. A vehicle 604 is approaching the intersection 602. The goal of the vehicle 604 is to safely traverse the intersection 602 by making a right-hand turn.

The vehicle operational scenario 630 also includes a vehicle 612 that is approaching the intersection 602 from the left side of the vehicle 604. The vehicle 612 has the right of way and does not have a stop sign. Thus, vehicle 612 can proceed through the interaction without stopping first. However, the vehicle 604 cannot determine the lane the vehicle 612 is traveling in. Additionally, the vehicle 612 may begin slowing down to a stop or turn before crossing the path of the vehicle 604. Thus, the intersection 602 may appear as a T-like intersection with respect to the vehicle 604. In this scenario, the vehicle 604 may or may not complete the right-hand turn safely depending on the lane in which the vehicle 612 is traveling. As such, the vehicle 604 may wait to complete the right-hand turn until the lane in which the vehicle 612 is traveling may be determined.

Referring again to FIG. 5, the first world model determined at operation 502 is a modified copy of the second world model. The second world model may be representative of a vehicle operational scenario such that the second world includes incomplete state information. For example, the operational environment data may not be complete so the associated state information is unavailable. As explained above with reference to FIG. 3, a vehicle operational scenario is formed of features, the states of which can be used for decision-making. For example, in the vehicle operational scenario 630 of FIG. 6, the lane in which vehicle 612 is traveling is not determined. Accordingly, the vehicle 612 is observed, but the state information is incomplete.

The first world model is modified at operation 502 to include perfect information (also called complete state information) by providing states for different subsets of features of the second world model that have incomplete state information. For example, in the vehicle operational scenario 630, the state information used by the first world model determined at operation 502 can be that the vehicle

612 is in the left lane or the right lane-state information that is unavailable in the second world model.

At operation 504, the method 500 generates a first value quantifying behavior of a first artificial intelligence (AI) agent. That is, the first AI agent performs a sequence of actions responsive to the given vehicle operational scenario in accordance with a model. In an example, the first AI agent may be represented by a POMDP agent. A POMDP is a tuple represented by equation (1).

$$P = \langle S, A, O, T, \Omega, R, \gamma \rangle \tag{1}$$

In equation (1), S is a finite set of states $\{s_1, s_2, s_3, \ldots, s_s\}$ where each state consists of a set of features $F = \{f_1, f_2, f_3, \ldots, f_f\}$. A is a finite set of actions $\{a_1, a_2, a_3, \ldots, a_a\}$. O is a finite set of observations $\{o_1, o_2, o_3, \ldots, o_o\}$. T is the state transition function represented by equation (2).

$$S \times A \times S \rightarrow [0, 1] \tag{2}$$

T(s, a, s') represents the probability of moving from state s to state s' given action a. $\Omega$ is the observation function represented by equation (3).

$$A \times S \times O \rightarrow [0, 1] \tag{3}$$

O(a, s', o) is the probability of receiving observation o after taking action a and ending up in state s'. R is the reward function represented by equation (4).

$$S \times A \rightarrow R \tag{4}$$

Here, $\gamma$ is the discount factor$\in$ [0,1]. The goal of a POMDP agent is to maximize the expected cumulative discounted reward represented by formula (5).

$$\mathbb{E}\left[\sum_{t=0}^{\infty} \lambda^t R(s_t, a_t)\right] \tag{5}$$

Here $s_t$ is the state of the agent at time t, and $a_t$ is the action taken by the agent at time t. The solution is an optimal policy that maximizes the expected reward. A policy is a mapping from the state of the agent to a prescribed action. However, the state of the agent is only partially observable—as such the concept of beliefs is relied on. A belief b$\in$B is a probability distribution over S. A POMDP policy $\pi$: B$\rightarrow\Delta$A maps a belief b$\in$B to a distribution over actions $\alpha\in$A. The policy $\pi$ can be used to quantify the expected total reward of executing the policy $\pi$ starting from belief b and can be represented by equation (6).

$$V(b) = R(b, \pi(b)) + \gamma \sum_{b'} Pr(b' \mid b, \pi(b)) V(b') \tag{6}$$

Here Pr(b'|b, a) is the probability of transitioning to belief b' using the observation received after taking action a. Alternatively, if the optimal policy $\pi$*is used, then the optimal value V* is obtained. Furthermore, the action-value function (i.e., Q-function) for a given policy may be represented by formula (7).

$$Q(b, a) = R(b, a) + \gamma \sum_{b'} Pr(b' \mid b, a) V(b') \tag{7}$$

To generate (derive, determine, calculate) a first value at operation 504, the first world model is used. As mentioned, the first world model includes a complete set of observations for a subset of features. For example, the first world model may be a representation of a distinct vehicle operational scenario such as the vehicle operational scenario 630 of FIG. 6. In this example, the uncertainty as depicted therein may be removed from the first world model.

In other words, the first world and the second world model are equivalent in every aspect except that in the first world model, the first AI agent can perfectly observe a subset of the features. The subset of feature may be represented by equation (8).

$$F_i \in \mathcal{P}(F) \tag{8}$$

Here, $\mathcal{P}$ (F) is the power function of F. Allowing the first AI agent to perfectly observe the subset of features allows for isolation of the impact of an individual feature within the sequence of actions for the vehicle operational scenario. For example, as the first AI agent performs a sequence of actions to navigate the vehicle operational scenario 630, the first world model may represent the vehicle 612 as being present in the left lane. The first value may be computed using equation (6), the expected total reward of executing policy $\pi$ or the first value may be computed using equation (7), the Q-function.

After the first AI agent has performed the sequence of actions within the first world model, the belief state of a second AI agent is updated in the second world model. One of three different approaches (i.e., a probing strategy) may be used to update the belief state of the second AI agent from first AI agent in the first world model. Using the first approach (KS), the first AI agent stays exactly in K (i.e. a pre-defined number) steps in the first world before updating the belief state of the second AI agent in the second world model. Using the second approach (GE), the first AI agent stays K (i.e. a pre-defined number) steps in expectation with K~Geometric($\lambda$) in the first world model. However, after each step, the first AI agent may update the second AI agent in the second world with probability $\lambda$. Using the third approach (MY), the second AI agent lacks awareness of the first world model. The lack of awareness prevents the second AI agent from adjusting the long-term strategy used while executing the K steps, thus leading to a myopic use of the given information.

At operation 508, the method 500 generates (derives, determines, calculates) a second value quantifying behavior of a second artificial intelligence (AI) agent. That is, the second AI agent performs a sequence of actions responsive to the given vehicle operational scenario using the second world model. The second AI agent may be represented by a POMDP agent as described above. The second world model includes an incomplete set of observations for the subset of features. For example, the second world model may be a representation of a distinct vehicle operational scenario such as the vehicle operational scenario 630 of FIG. 6. As such, the second world model does not include complete state information.

At operation 510, the method 500 determines a difference between the first value and the second value. That is, the method 500 compares the value of the information derived from the subset of features when the first AI agent can perfectly observe the subset of features. For example, when an AV approaches an intersection with the goal of traversing the intersection by making a right-hand turn, an AI agent may be presented with a vehicle operational scenario such as vehicle operational scenario 630 of FIG. 6. If the AI agent is uncertain about the lane in which a vehicle 612 traveling towards the AV (the vehicle 604) is, the AI agent may make the decisions to stop and wait to gather more information. The AI agent may wait until the vehicle has passed the AV entirely or the AI agent may wait long enough to determine the lane of the vehicle before making the determination that it is safe to complete the right-hand turn. The decision to stop and wait for the vehicle to pass or the decision to stop and wait to determine the lane of the vehicle may be quantified by equation (6) or equation (7), or a combination thereof.

Thereafter, the method 500 determines whether there are any remaining subsets of features of the vehicle operational scenario to apply to an instantiation of the first world model. For example, the initial subset of features used to determine the first and second values could include the state information that is known about the vehicle operational scenario 630 plus the state information that the vehicle 612 is traveling in the left lane, while another subset of features could include the state information that is known about the vehicle operational scenario 630 plus the state information that the vehicle 612 is traveling in the right lane. This example uses a subset of features that changes the state of one feature. However, multiple states of multiple features may be sequentially used to determine the first world model at operation 502, generate a first value at operation 504, generate a second value at operation 506, and determine a difference at operation 508.

Once there are no subsets of features remaining in response to the query at operation 510, the method 500 advances to operation 512.

At operation 512, the method 500 calculates the impact of individual features within the second world model using the differences. The impact of individual features may be a value of information (VoI) or an impact of information (IoI) for each individual feature. The VoI quantifies how imperfect information about a subset of information affects the performance of the second AI agent. More specifically, VoI quantifies the expected utility the second AI agent loses due to a lack of information about a subset of features for the next K time steps. The subset of features may be represented by equation (9).

$$F_i \subseteq \mathcal{P}(F) \tag{9}$$

If the individual feature has a large VoI, then an AI agent using a utility-maximizing strategy is more likely to seek the information pertaining to that feature. Alternatively, if the individual feature has a small VoI, then the AI agent using a utility-maximizing strategy is less likely to seek that information. As such, the VoI may be used as an indicator of the AI agent's propensity to seek information for individual features in the near future. The VoI may be expressed in relation to the expected utility the AI agent could achieve from the current belief b if the AI agent is given perfect information about $F_i \subseteq \mathcal{P}$ (F) for the next K steps and the probing strategy used.

For the KS probing strategy, the VoI may be represented by equation (10).

$$V_{F_i}(b, K > 0) = R(b_{F_i}, \pi(b_{F_i})) + \gamma \sum_{b'} Pr(b' \mid b_{F_i}, \pi(b_{F_i})) V_{F_i}(b', K - 1) \tag{10}$$

$$V_{F_i}(b, K \leq 0) = V_{F_i}(b_{F_i}, 0)$$

Here $b_{F_i}$ is the updated belief b obtained using $F_i=f_i$. Furthermore, $b_{F_i}$ may also be expressed as $b_{F_i}$=normalized ($\hat{b}_{F_i}$) and $\hat{b}_{F_i}$ may be represented by equation (11).

$$\hat{b}_{F_i} = \begin{cases} b(s), & F_i(s) = f \\ 0, & \text{otherwise} \end{cases} \tag{11}$$

For the GS probing strategy, the VoI may be represented by equation (12).

$$V_{F_i}(b, M, \lambda) = \tag{12}$$
$$R(b_{F_i}, \pi(b_{F_i})) + \gamma \sum_{b^M} Pr(b^M \mid b_{F_i}, \pi(b_{F_i})) V_{F_i}(b^M, M) +$$
$$(1 - \lambda) \sum_{b^{\bar{M}}} Pr(b^{\bar{M}} \mid b_{F_i}, \pi(b_{F_i})) V_{F_i}(b^{\bar{M}}, \bar{M})$$

Here M indicates the first world model, and $\bar{M}$ indicates the second world model. Based on this the value of the sequence of information can be defined as the different between the value function and the information probing V and $V_{F_i}$ which may be represented by equation (13).

$$VoI(b, F_i, K) = V_{F_i}(b, K) - V(b) \tag{13}$$

The MY probing strategy may be expressed in terms of the KS probing strategy using equation (14).

$$VoI(b, F_i, K) = \tag{14}$$
$$\mathbb{E}\left[\sum_{j=0}^{K} VoI(b^j, F_i, 1)\right] = \mathbb{E}\left[\sum_{j=0}^{K} VoI(b_{F_i}^j, K) - V(b^j)\right]$$

Here, the expectation is over the distribution of K−1 belief can be reached after belief b executing the policy induced by V.

After the VoI is calculated for each individual feature, a marginal value is obtained. The marginal value may be obtained using the Shapely Value Framework represented by equation (15).

$$C_i(VoI) = \frac{1}{|F|!} \sum_{pr \in Pr_n} \left[ VoI(F_{F_i}^{pr} \cup \{F_i\}, K) - VoI(F_{F_i}^{pr}, K) \right] \tag{15}$$

Additionally, the VoI exhibits several important properties: (1) if K≤0: $VoI_{F_i}$(b, K)=0, (2) if $F_i$≤∅: $VoI_{\varnothing}$ (b, K)=0, (3) the efficiency of marginal VoI: $VoI_F$(b, K)=$\Sigma_i^{|F|} C_i$(VoI), and (4) the relationship between probing strategies (i.e., transportation approaches) $VoI_{MY}$(b, K)≤$VoI_{GE}$(b, K)≤$VoI_{KS}$ (b, K).

While the VoI quantifies how imperfect information affects a behavior of the AI agent in the near future, the VoI does not provide a direct explanation of the behavior. However, Influence of Information (IoI) may be used to quantify the likelihood of observing a behavior when probed with sequential information. The IoI calculates a negative-log likelihood (NLL) ratio of observing a behavior given different subsets of features with perfect observability. The behavior (i.e., $\tau$) may be represented by equation (16).

$$\tau = \{b^0, s^0, a^0, b^1, s^1, a^1, \ldots, b^K, s^K, a^K,\} \qquad (16)$$

The NLL behavior of $\tau$ may be represented by equation (17).

$$-\log P(\tau \mid \pi) = \qquad (17)$$
$$-\sum_{i=0}^{K} \log \pi(a^i \mid b^i) - \sum_{i=0}^{K} \log T(s^i \mid a^{i-1}, s^{i-1}) - \sum_{i=0}^{K} \log O(o^i \mid a^{i-1}, s^i)$$

Furthermore, if an entropy regularized policy $\pi$ is used then the probability distribution over the actions A may be represented by equation (18).

$$\pi(a \mid b) = \frac{e^{Q(a,b)}}{\sum_{a^j \in A} e^{Q(b,a^j)}} \qquad (18)$$

Alternatively, if a deterministic policy $\pi$ is used, then a Laplace smoothed probability distribution over the actions A may be used as represented by equation (19).

$$\pi(a \mid b) = \begin{cases} 1 - \epsilon, & a = \text{argmax}_{a \in A} Q(a, b) \\ \frac{\epsilon}{|A| - 1}, & \text{otherwise} \end{cases} \qquad (19)$$

The influence of sequential information probing on the behavior $\tau$ and the NLL-ratio under the policy $\pi$ and $\pi_{F_i}^K$ may be represented by equation (20).

$$IoI_{F_i}(\tau, K) = -\log \frac{P(\tau_{F_i} \mid \pi_{F_i}^K)}{P(\tau \mid \pi)} \qquad (20)$$

Here, $\tau_{F_i} = \{b_{F_i}^0, s_K^0, a^0, \overline{o}^1, s_{K-1}^1, a^1, \ldots, \overline{o}^K, s_0^K, a^k\}$ and $\overline{o}^K = (o^K, F_i(s_{K-1}^1), K-1), \pi_{F_i}^K$, is the policy the induces $V_{F_i}(\cdot, K)$ and $s_j^i$ is the state time i with an indicator j. The variable j indicates the number of steps remaining, or in the case of the probing strategy GE, j indicates whether the agent is in the first world model or the second world model. Additionally, when using the KS probing strategy, the T-terms cancel the O-terms allowing for the IoI to be expressed using the simplified equation (21).

$$IoI_{F_i}(\tau, K) = \sum_{i=0}^{K} \log \pi(a^i \mid b^i) - \sum_{i=0}^{K} \log \pi_{F_i}^K(a^i \mid b_{F_i}^i) \qquad (21)$$

When using the GE probing strategy, the IoI may be represented by an equation similar to equation (21). However, the GE probing strategy contains an additional term that only depends on K and $\lambda$, which can be ignored. For the MY probing strategy, the IoI may be represented by equation (22).

$$IoI_{F_i}(\tau, K) = \sum_{i=0}^{K} \log \pi(a^i \mid b^i) - \sum_{i=0}^{K} \log \pi(a^i \mid b_{F_i}^i) \qquad (22)$$

The IoT also exhibits several important properties: (1) if $K \leq 0$: $IoI_{F_i}(\tau, K) = 0$, (2) if $F_i \leq \emptyset$: $IoI_{\emptyset}(\tau, K) = 0$, and (3) the efficiency of marginal IoI: $IoI_F(\tau, K) = \Sigma_i^{|F|} C_i(IoI)$.

The VoI and IoI may be calculated for both discrete and continuous state spaces. For discrete space the main component of VoI, $V_{f_i}^\pi$, may be calculated by generating a combined (e.g., POMDP) model of the first world model and the second world model. The combined POMDP model, for example, may be represented by equation (23).

$$\overline{P_{F_i}} = \langle \overline{S}, A, \overline{O}, \overline{T}, \overline{\Omega}, R, \gamma \rangle \qquad (23)$$

For the KS probing strategy $\overline{P_{F_i}}$ may be defined as follows: $\overline{S}$ is an augmented state space with $\overline{F} = \{f_1, f_2, f_3, \ldots, f_{|F|}, \text{Time}\}$, where $\text{Time} \in \{0, 1, \ldots, K\}$ and indicated the number of steps for which perfect observability is available. $\overline{O}$ is a finite set of observations by adding the true value of features in $F_i \subseteq F$ and Time. For example, instead of receiving $o_i$ at time=x, the agent receives $\{o_i, x, F_i(s)\}$ when $x > 0$ and $\{o_i, 0, \emptyset\}$ otherwise. $\overline{T}$: $\overline{S} \times A \times \overline{S} \rightarrow [0,1]$ is the augmented state transition function represented by equation (24).

$$\overline{T}(\overline{s}, a, \overline{s}') = \begin{cases} T(s, a, s'), & \text{Time}(s) = \text{Time}(s') = 0, \qquad (24) \\ T(s, a, s'), & \text{Time}(s) = \text{Time}(s') - 1, \\ 0, & \text{otherwise} \end{cases}$$

$\overline{\Omega}$: $A \times \overline{S} \times \overline{O} \rightarrow [0,1]$ is the augmented observation function, which may be represented by equation (25).

$$\overline{\Omega}(a, \overline{s}', \overline{o}) = \begin{cases} \Omega(a, s', o), & \text{Time}(s) = 0 \wedge \overline{o} = \{o, 0, \emptyset\}, \qquad (25) \\ \Omega(a, s', o), & \text{Time}(s) > 0 \wedge \overline{o} = \{o, \text{Time}(s), F_i(s)\}, \\ 0, & \text{otherwise} \end{cases}$$

For the GE probing strategy $\overline{P_{F_i}}$ may be defined as follows: $\overline{S}$ is an augmented state space with $\overline{F} = \{f_1, f_2, f_3, \ldots, f_{|F|}, M\}$, where M is an indicates whether the AI agent is in the first world or the second world. $\overline{O}$ is a finite set of observations by adding the true value of features in $F_i \subseteq F$ similar to the KS probing strategy. $\overline{T}$: $\overline{S} \times A \times \overline{S} \rightarrow [0,1]$ is the augmented state transition function represented by equation (26).

$$\overline{T}(\overline{s}, a, \overline{s}') = \begin{cases} T(s, a, s'), & V \text{ is } (s) = Vs(s') = \text{False}, \qquad (26) \\ \lambda * T(s, a, s'), & V \text{ is } (s) = \text{True} \wedge V \text{ is } (s') = \text{False}, \\ (1 - \lambda) * T(s, a, s'), & V \text{ is } (s) = Vs(s') = \text{True}, \\ 0 & V \text{ is } (s) = \text{False} \wedge V \text{ is } (s') = \text{True} \end{cases}$$

$\overline{\Omega}$: $A \times \overline{S} \times \overline{O} \rightarrow [0,1]$ is the augmented observation function, which may be represented by equation (27).

33

$$\bar{\Omega}(a, \bar{s}', \bar{o}) = \begin{cases} \Omega(a, s', o), & Vs(s') = \text{False} \wedge \bar{o} = \{o, \emptyset\}, \\ \Omega(a, s', o), & Vs(s') = \text{True} \wedge \bar{o} = \{o, F_i(s)\}, \\ 0, & \text{otherwise} \end{cases} \quad (27)$$

The combined POMDP for the GE probing strategy has K/2 times fewer states and K times fewer observations. Additionally, for the MY probing strategy, only the value function of the POMDP relative to the first world model is calculated. After the POMDP models are solved using an α-vector policy $V_{F_i}^\pi(b, s)$ may be calculated using equation (28).

$$V_{F_i}^\pi(b, s) = \max_{\alpha \in \Gamma}(\alpha \cdot \overline{b_{F_i,s}}) \quad (28)$$

Here, s is the true state at the time when the AI agent has the belief b and $\overline{b_{F_i,s}}$=normalize ($\widehat{b_{F_i,s}}$) which is represented by equation (29).

$$\widehat{b_{F_i,s}}(\bar{s}) = \begin{cases} b(s), & V \text{ is } (\bar{s}) = \text{True} \wedge F_i(s) = F_i(\bar{s}), \\ 0, & \text{otherwise} \end{cases} \quad (29)$$

Using the aforementioned equations, VoI and IoI can be directly calculated; however, if the true state is not available, $V_{F_i}^\pi(b)$ may be calculated using equation (30).

$$V_{F_i}^\pi(b) = E_{s \sim b}\left[\max_{\alpha \in \Gamma}(\alpha \cdot \overline{b_{F_i,s}})\right] \quad (30)$$

Similarly, without access to the true state in the observed behavior, IoI can be calculated using equation (31).

$$IoI_{F_i}(\tau, K) = E_{\tau_s \sim \mathcal{D}}[IoI(\tau \cup \tau_s, K)] \quad (31)$$

Here, $\tau_s$ is the sequence of state missing from τ and $\mathcal{D}$ is a distribution from which $\tau_s$ is sampled. The natural choice for the distribution is the one induced by the observation in τ; however, the choice of distribution might not be easily applicable in the continuous state space and a different distribution such as the uniform distribution may be considered.

For continuous state space, explicit representations of T and O may not be available. Additionally, large or infinite state spaces may make it impossible to apply an α-vector policy. Instead, it is common to train the AI agent by simulation of the environment using deep reinforcement learning on the belief state. Further, if an explicit belief update is not available, the AI agent can jointly learn the belief update function along with the policy.

To calculate the VoI and the IoI, a set of values of policies corresponding to different feature sets $F_i \in F$ may be used. A Meta Deep-Q learning algorithm may be designated that jointly learns the Q-value function for each feature set $F_i \in F$. The Meta Deep-Q learning algorithm may be represented by algorithm (1).

| Require: $Q_{\bar{\theta}}$, $B_{\bar{\phi}}$, Transition strategy TS |
|---|
| 1. $Q_\theta^{Meta} \leftarrow$ Initialize randomly |
| 2. $B_\phi^{Meta} \leftarrow$ Initialize randomly |

34

-continued

| Require: $Q_{\bar{\theta}}$, $B_{\bar{\phi}}$, Transition strategy TS |
|---|
| 3. Replay_Buffer $\leftarrow \emptyset$ |
| 4. while condition not met do |
| 5. $h_0, s_0 \sim$ simulate($Q_{\bar{\theta}}, B_{\bar{\phi}}$) |
| 6. $F_i \sim P(F)$ |
| 7. $D \leftarrow$ Collect_Transitions ($Q_\theta^{Meta}, B_\phi^{Meta}, h_0, s_0, F_i$, TS) |
| 8. Replay_Buffer $\leftarrow$ Update (Replay$_{Buffer}$, D) |
| 9. Update $Q_\theta^{Meta}, B_\phi^{Meta}$ using Equations 31, 32, 33, 34 |
| 10. end while |
| 11. return Meta - $Q_{\phi,\theta}$ |

The algorithm (1) takes input Q-function and belief update function $Q_{\bar{\theta}}$, $B_{\bar{\phi}}$ for the POMDP relative to the second world model. The algorithm (1) starts by initializing a meta-Q function $Q_\theta^{Meta}$, a meta-belief function $B_\phi^{Meta}$ and a replay buffer. There are three key differences in the training process compared to a standard implementation of deep Q-learning. First, the starting history and state distribution are defined by the original policy (line 5 of algorithm (1)). This is done to account for the computing the VoI and the IoI starting from different history under the original policy. Second, the Collecton_Transitions function receives as input the starting state, history, and the feature set for which perfect information will be supplied and generates a transition for training. It is worthing noting that when using the GE probing strategy, the simulation may stop providing information about $F_i$ at each step with probability λ. Lastly, the third key difference is that the Q-function is trained using the standard Deep-Q learning loss function represented by equation (32).

$$\mathcal{L}_{(\theta,\phi)} = \frac{1}{N}\sum_{i=1}^N \left(r_i + \gamma Q_\theta^{Meta}(B_\phi(h_i'), a_i') - Q_\theta^{Meta}(B_\phi(h_i), a_i)\right)^2 \quad (32)$$

Here, N is the batch size. Importantly, three regularizations to enforce $Q_\theta^{Meta}$, $B_\theta^{Meta}$ to emulate $Q_{\bar{\theta}}$, $B_{\bar{\phi}}$ when $F_i=\emptyset$ are introduced. This is desirable for several reasons including speeding up training, maintaining faithfulness to the original policy, and for using the MY probing strategy. The first regularization may be used to keep the difference between the Q-estimates low when $F_i=\emptyset$ and may be represented by equation (33).

$$\mathcal{L}_{(\theta,\phi)}^{QD} = \left(Q_\theta^{Meta}(B_\phi(h), a) - Q_{\bar{\theta}}(B_{\bar{\phi}}(h), a)\right)^2 \quad (33)$$

The second regularization may be used to ensure the representations are similar when $F_i=\emptyset$ and may be represented by equation (34).

$$L_{(\phi)}^{RD} = \left(B_\phi(h) - B_{\bar{\phi}}(h)\right)^2 \quad (34)$$

The third regularization may be used to ensure the two belief representations induce similar Q values in the original policy $Q_{\bar{\theta}}$ when $F_i=\emptyset$ for calculations using the MY probing strategy. The third regularization may be represented by equation (35).

$$\mathcal{L}_{(\theta,\phi)}^{RD2} = \left(Q_{\bar{\theta}}\left(B_{\bar{\phi}}(h),\, a\right) - Q_{\bar{\theta}}\left(B_{\phi}(h),\, a\right)\right)^2 \qquad (35)$$

Collectively, all of the loss functions may be represented by equation (36).

$$\mathcal{L}_{(\theta,\phi)} + \beta_1 \mathcal{L}_{(\theta,\phi)}^{QD} + \beta_2 \mathcal{L}_{(\theta,\phi)}^{RD} + \beta_3 \mathcal{L}_{(\theta,\phi)}^{RD2} \qquad (36)$$

The regularizations are only applied when $F_i = \emptyset$. Once $Q_\theta^{Meta}$ and $B_\theta^{Meta}$ are known $V_{F_i}^\pi(b)$ may be calculated using equation (37).

$$V_{F_i}^\pi(b) = \mathbb{E}_{s \sim \mathcal{G}(h)}\left[\max_{a \in A} Q_\theta^{Meta}\left(B_\theta^{Meta}\left(h_{F_{i,s}}\right),\, a\right)\right] \qquad (37)$$

Here, $\mathcal{G}$(h) is a generator model that captures the distribution over the given history of a states. Furthermore, if the simulator does not have the capacity to generate the distribution over the given history of a state, the simulator may learn it from the data. $h_{F_{i,s}}$ is the current history in which the last observation is replaced with the observation from the information probed. The IoI may be calculated using a similar method as the VoI.

Leveraging the method disclosed, explanations may be generated for approximately 20 POMDPs at a rate of 10 explanations per second per POMDP.

Once the impact of the individual features is calculated (determined, derived, inferred) at operation 512, the method 500 may use the information at operation 514 to update a decision-making process of the second AI agent. The updated decisions-making process of the second AI agent may be used to control the vehicle using a control system of the vehicle. The control system of the vehicle may be the controller 130 of FIG. 1. That is, the second AI agent may change how it prioritizes what information is important to achieve the goal. For example, the AV may approach an intersection, such as the intersection 602 of FIG. 6. The AV may have the goal of traversing the intersection by making a right-hand turn. The second AI agent may make the decision to stop and wait or the second AI agent may make the decision to turn immediately based on the vehicle operational scenario. Knowing which features have a higher VoI or a higher IoI, the second AI agent may prioritize those features as more important and seek that information the next time the same vehicle operational scenario is encountered.

Figure 7A:
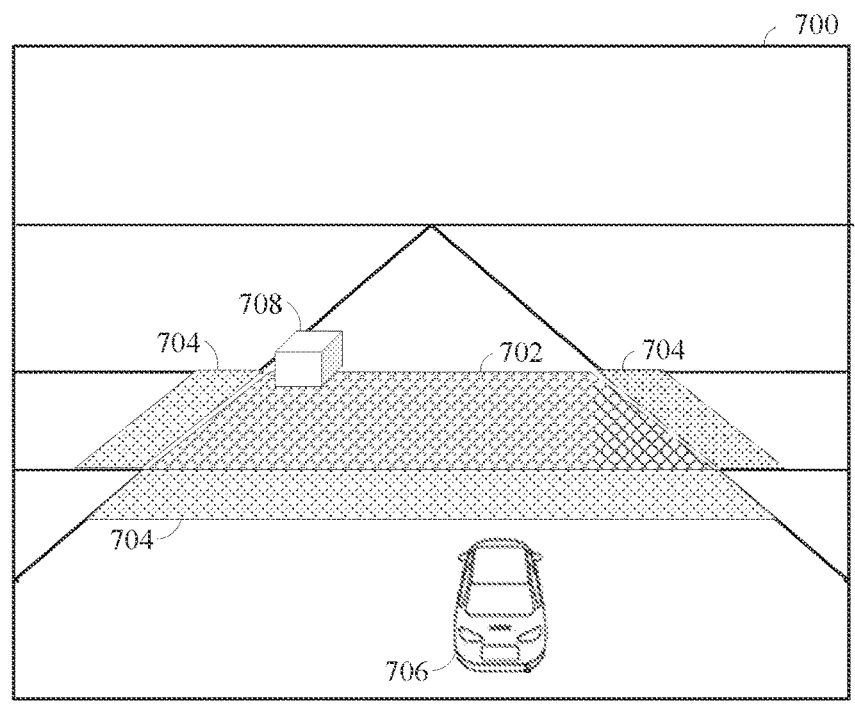
FIGS. 7A and 7B are diagrams that illustrate the value of information (VoI) visualized within an autonomous vehicle.
Figure 7B:
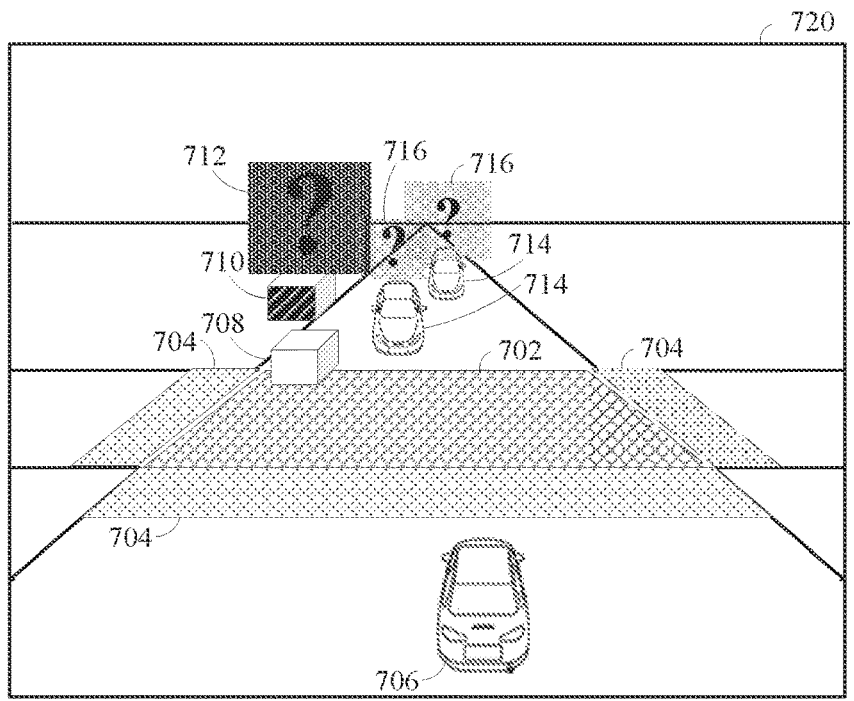

FIGS. 7A and 7B are illustrations of the value of information (VoI) visualized within an autonomous vehicle. Illustration 700 depicts an intersection 702, stop lines 704, a vehicle 706, and a traffic signal 708. The vehicle 706 can be the vehicle 100 of FIG. 1. The vehicle 706 can be one of the vehicles 210/211 of FIG. 2. The vehicle 706 can include an autonomous vehicle operational management system, such as the autonomous vehicle operational management system 300 of FIG. 3. The stop lines 704 represent the minimum safe distance that a vehicle may stop before entering the intersection 702. As the vehicle 706 approaches the intersection 702, the state of the traffic signal 708 is known such that there is no uncertainty about the state of the traffic signal 708. Because there is no uncertainty about the state of the traffic signal, the method 500 does not use the traffic signal 708 as a feature modified to generate a first world model and to calculate the VoI and the IoI in the vehicle operational scenario.

Illustration 720 depicts the same intersection 702, stop lines 704, the vehicle 706, and the traffic signal 708. Additionally, illustration 720 depicts a traffic signal 710 and VoI indicator 712, external vehicles 714 and VoI indicators 716. After the vehicle stops at the traffic signal 708, the traffic signal 708 changes from red to green. At the time when the state of the traffic signal changes from red to green, the state of the traffic signal is unknown as represented by the traffic signal 710. The goal of the vehicle 706 is to safely traverse the intersection.

Knowing the state of the traffic is signal important to achieving this goal. As such, the VoI of the state of the traffic signal 708 and traffic signal 710 may be high. This is indicated in the illustration 720 by the visibility (i.e. opacity) of VoI indicator 712 relative to the value of the VoI. That is, when the VoI of the feature (e.g., traffic signal 708, traffic signal 710) is high, the VoI indicator is more prominently displayed. Additionally, the state of the external vehicles 714 is unknown to the vehicle 706; however, the VoI of the external vehicles is low relative to the goal of the vehicle 706. As such the VoI indicators 716 are less visible (i.e. less opaque) relative to the value of the VoI.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described to allow easy understanding of the disclosure are not limiting. On the contrary, the disclosure covers various modifications and equivalent arrangements included within the scope of the appended claims, which scope is to be accorded the broadest interpretation to encompass all such modifications and equivalent structure as is permitted under the law.

What is claimed is:

1. A method, comprising:

determining a first world model, wherein the first world model is a copy of a second world model for sequential decision making with incomplete state information;

for respective subsets of features comprising a vehicle operational scenario within a vehicle transportation system:

generating a first value quantifying behavior of a first artificial intelligence (AI) agent as the first AI agent performs a sequence of actions responsive to the vehicle operational scenario using the first world model, wherein the first AI agent includes a complete set of observations for the subset of features within the first world model;

generating a second value quantifying behavior of a second AI agent as the second AI agent performs a sequence of actions responsive to the vehicle operational scenario using the second world model, wherein the second AI agent includes an incomplete set of observations for the subset of features within the second world model; and determining a difference between the first value and the second value;

calculating an impact of individual features on the second AI agent within the second world model using the differences; and selectively, based on the impact of individual features, updating a decision-making process of the second AI agent.

2. The method of claim 1, wherein the sequence of actions performed by the first AI agent includes a pre-defined number of actions.

3. The method of claim 1, wherein generating the second value comprises:

introducing the second AI agent into the second world model; and allowing the second AI agent to perform the sequence of actions within the second world model.

4. The method of claim 1, wherein generating the first value comprises:

introducing the first AI agent into the first world model;

allowing the first AI agent to perform the sequence of actions within the first world model; and updating a belief state of the second AI agent using the first AI agent.

5. The method of claim 4, wherein generating the first value further comprises:

providing the first AI agent with information that the first world model is a copy of the second world model.

6. The method of claim 4, wherein updating the belief state of the second AI agent using the first AI agent may be performed after each action in the sequence of actions.

7. The method of claim 1, wherein the second AI agent is used, by a control system of the vehicle, to control the vehicle.

8. An apparatus, comprising:

a memory; and a processor configured to execute instructions stored in the memory to:

determine a first world model, wherein the first world model is a copy of a second world model for sequential decision making with incomplete state information;

for respective subsets of features comprising a vehicle operational scenario within a vehicle transportation system:

generate a first value quantifying behavior of a first artificial intelligence (AI) agent as the first AI agent performs a sequence of actions responsive to the vehicle operational scenario using the first world model, wherein the first AI agent includes a complete set of observations for the subset of features within the first world model;

generate a second value quantifying behavior of a second AI agent as the second AI agent performs a sequence of actions responsive to the vehicle operational scenario using the second world model, wherein the second AI agent includes an incomplete set of observations for the subset of features within the second world model; and determine a difference between the first value and the second value;

calculate an impact of individual features on the second AI agent within the second world model using the differences; and selectively, based on the impact of individual features, update a decision-making process of the second AI agent.

9. The apparatus of claim 8, wherein the sequence of actions performed by the first AI agent includes a pre-defined number of actions.

10. The apparatus of claim 8, wherein to generate the second value includes instructions to:

introduce the second AI agent into the second world model; and allow the second AI agent to perform the sequence of actions within the second world model.

11. The apparatus of claim 8, wherein to generate the first value includes instructions to:

introduce the first AI agent into the first world model;

allow the first AI agent to perform the sequence of actions within the first world model; and update a belief state of the second AI agent using the first AI agent.

12. The apparatus of claim 11, wherein to generate the first value includes instructions to:

provide the first AI agent with information that the first world model is a copy of the second world model.

13. The apparatus of claim 11, wherein to update the belief state of the second AI agent using the first AI agent may be performed after each action in the sequence of actions.

14. The apparatus of claim 8, wherein the second AI agent is used, by a control system of the vehicle, to control the vehicle.

15. A non-transitory computer-readable medium storing instructions operable to cause one or more processors to perform operations comprising:

determining a first world model, wherein the first world model is a copy of a second world model for sequential decision making with incomplete state information;

for respective subsets of features comprising a vehicle operational scenario within a vehicle transportation system:

generating a first value quantifying behavior of a first artificial intelligence (AI) agent as the first AI agent performs a sequence of actions responsive to the vehicle operational scenario using the first world model, wherein the first AI agent includes a complete set of observations for the subset of features within the first world model;

generating a second value quantifying behavior of a second AI agent as the second AI agent performs a sequence of actions responsive to the vehicle operational scenario using the second world model, wherein the second AI agent includes an incomplete set of observations for the subset of features within second world model; and determining a difference between the first value and the second value;

calculating an impact of individual features on the second AI agent within the second world model using the differences; and selectively, based on the impact of individual features, updating a decision-making process of the second AI agent.

16. The non-transitory computer-readable medium of claim 15, wherein the sequence of actions performed by the first AI agent includes a pre-defined number of actions.

17. The non-transitory computer-readable medium of claim 15, wherein generating the second value comprises:

introducing the second AI agent into the second world model; and allowing the second AI agent to perform the sequence of actions within the second world model.

18. The non-transitory computer-readable medium of claim 15, wherein generating the first value comprises:

introducing the first AI agent into the first world model;

allowing the first AI agent to perform the sequence of actions within the first world model; and updating a belief state of the second AI agent using the first AI agent.

19. The non-transitory computer-readable medium of claim 18, wherein generating the first value further comprises:

providing the first AI agent with information that the first world model is a copy of the second world model.

20. The non-transitory computer-readable medium of claim 18, wherein updating the belief state of the second AI agent using the first AI agent may be performed after each action in the sequence of actions.

* * * * *